United States Patent
Shinomiya

(10) Patent No.: US 7,508,767 B2
(45) Date of Patent: Mar. 24, 2009

(54) ACCESS MANAGEMENT METHOD AND ACCESS MANAGEMENT SERVER

(75) Inventor: Daisuke Shinomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 497 days.

(21) Appl. No.: 11/024,099

(22) Filed: Dec. 28, 2004

(65) Prior Publication Data
US 2006/0007868 A1    Jan. 12, 2006

(30) Foreign Application Priority Data
Jul. 9, 2004   (JP) .............................. 2004-203675

(51) Int. Cl.
*H04J 1/16*     (2006.01)
(52) U.S. Cl. ................. 370/242; 370/252; 713/161
(58) Field of Classification Search ............... 370/230, 370/252, 241, 231, 235, 237, 242, 250, 253; 713/161, 168–170
See application file for complete search history.

(56) References Cited

U.S. PATENT DOCUMENTS 7,054,930 B1 *   5/2006   Cheriton ................... 709/226
7,075,912 B2 *   7/2006   Suda et al. ................. 370/331
2002/0078202 A1 *  6/2002   Ando et al. ................. 709/225

FOREIGN PATENT DOCUMENTS

JP    2003-008660    1/2003
JP    2003-249944    9/2003

* cited by examiner

*Primary Examiner*—Ricky Ngo
*Assistant Examiner*—Dady Chery
(74) *Attorney, Agent, or Firm*—Katten Muchin Rosenman LLP

(57) ABSTRACT

In an access management method in a network including at least one end system, a packet communication unit for routing, and an access management server including an authentication function, a communication partner is authenticated for each session and a communication permitted by a communication partner is permitted by the access management server. A packet meeting a condition of a denied packet being denied by the communication partner is discarded by the packet communication unit.

13 Claims, 10 Drawing Sheets

FIG.7
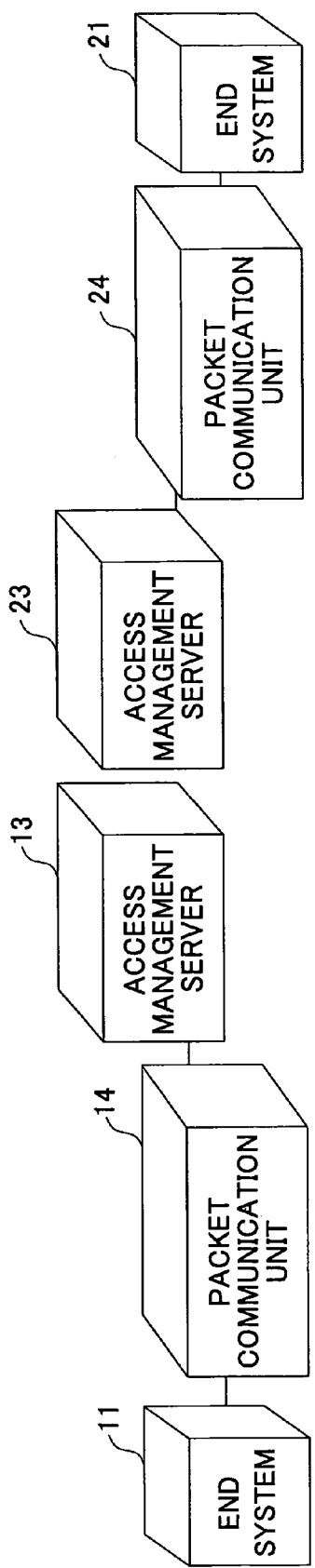
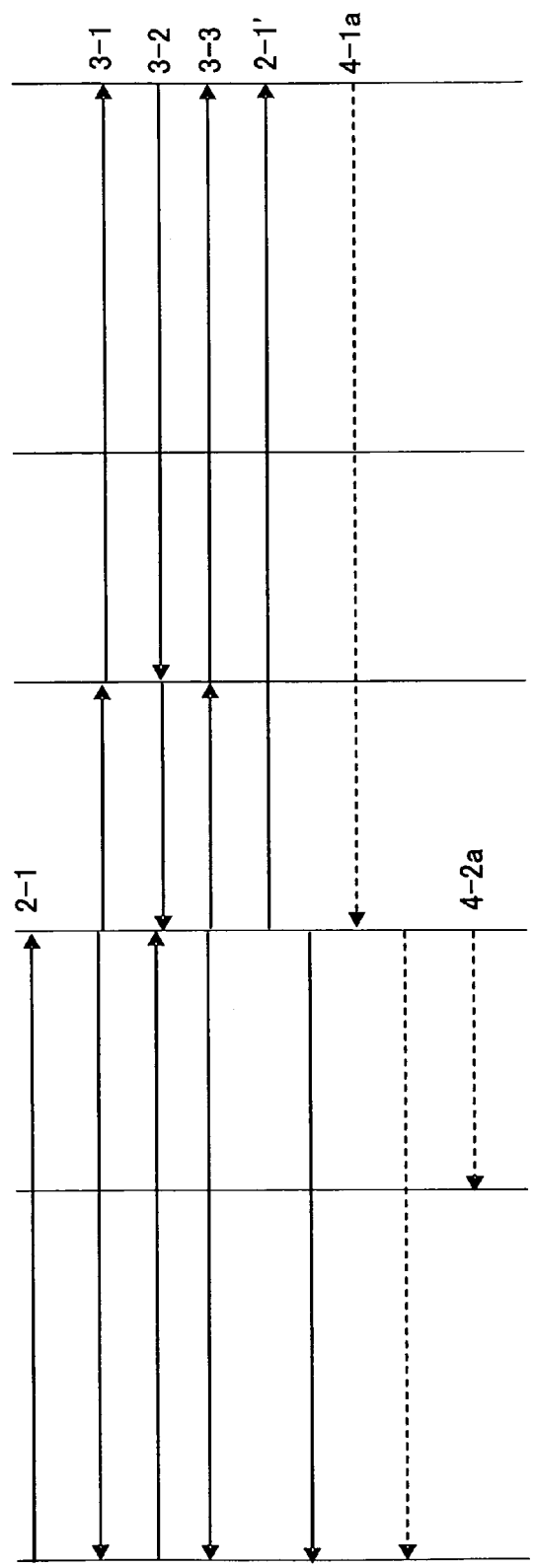

FIG.9

| REQUEST ORIGINATOR | REJECTION ITEM (REJECTION LEVEL) | SUBJECT 1 | SUBJECT 2 | PROCESS START TIME |
|---|---|---|---|---|
| 10.0.0.5 | IP ADDRESS (2) | 192.168.100.25 | — | 2004/2/18 14:00:15 |
| 10.0.0.5 | PORT NUMBER (1) | 192.168.100.26 | 25 | 2004/2/18 14:18:00 |
| ... | ... | ... | ... | ... |

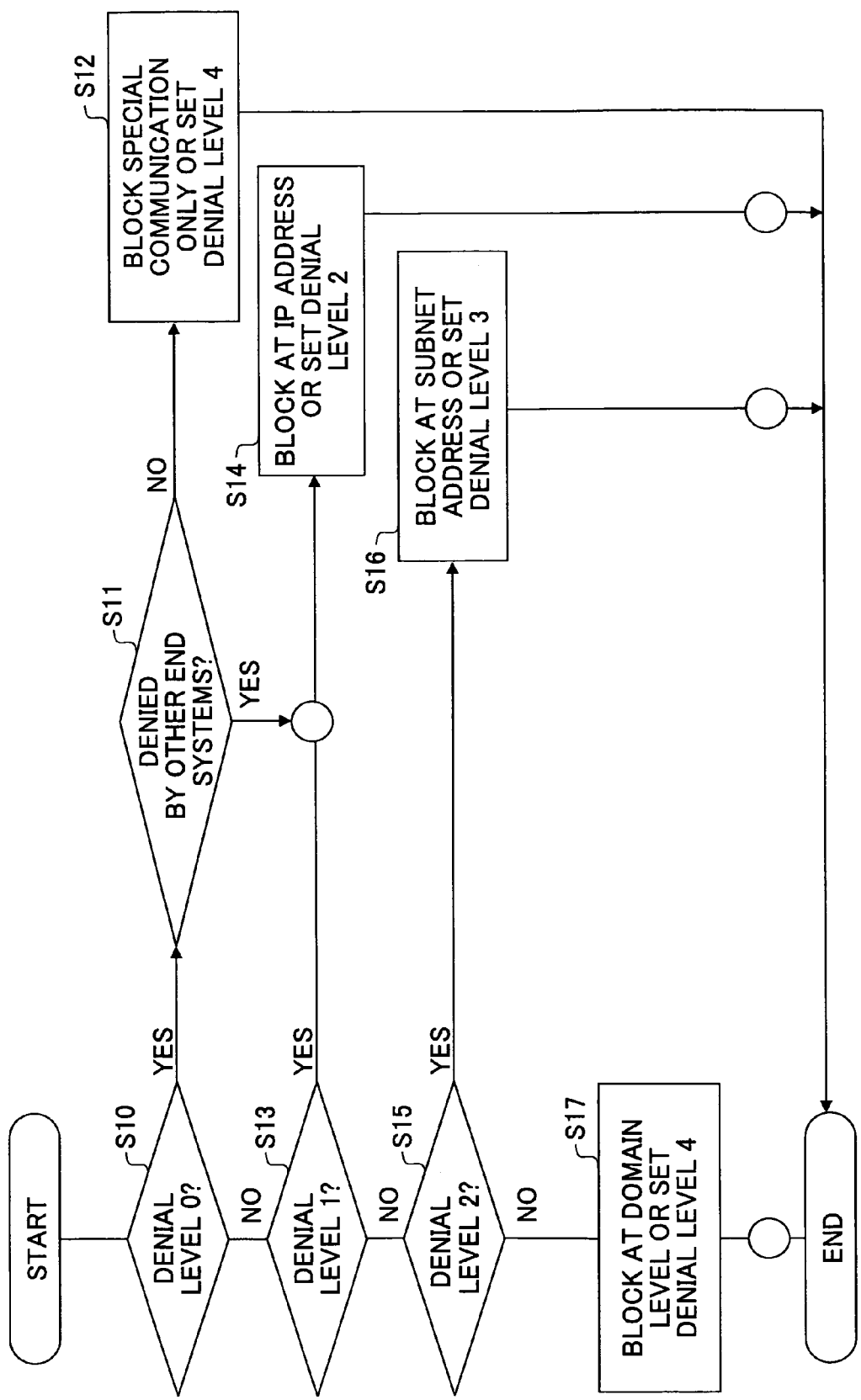

ACCESS MANAGEMENT METHOD AND ACCESS MANAGEMENT SERVER

BACKGROUND OF THE INVENTION

1. Field of the Invention

The present invention generally relates to access management methods and access management servers, and more particularly to an access management method in a network system including a packet communication apparatus for conducting a routing and an access management server having an authentication function, and the access management server.

2. Description of the Related Art

Recently, a personal computer has been widely used, and functions and performance of the personal computer and a network have been improved. In an organization, as a tool to smoothly operate a business, the network becomes more important and also important data are transmitted through the network. In order to secure the data, a security device such as a firewall system is provided against attacks of illegal access and viruses.

Japanese Laid-open Patent Application No. 2003-249944 discloses that an organization secures safety of a new base station arranged by a general user by conducting an authentication mutually between an authentication server and the new base station and the authentication is mutually conducted between the base station and a new radio terminal. In addition, Japanese Laid-open Patent Application No. 2003-249944 discloses that the base station first when the new radio terminal accesses and the base station does not transmit a packet being sent by the new radio terminal to a network at an organization side until the authentication succeeds mutually between the base station and the radio terminal, so as to prevent from a DoS (Denial of Service) attack which pretends an authentication.

Japanese Laid-open Patent Application No. 2003-8660 discloses that a permission list of IP addresses is provided to a router after a user is authenticated.

Recently, since it has been desired to provide means against problems such as a data leak, an attack by a virus to the network, various methods are proposed. However, those methods are not sufficient to solve the problems.

In the invention disclosed in Japanese Laid-open Patent No. 2003-8660, the permission list of IP addresses is provided to the router after the user is authenticated. Accordingly, the list of IP addresses is just one way of managing the list of IP addresses. In addition, since information showing a communication permission is set to an access management server and the information is just one way of managing the communication permission, it is impossible to manage the communication permission on a case-by-case basis in that one communication partner temporarily denies a communication with another communication partner or it is impossible to flexibly manage the communication permission in a case of determining a communication permission corresponding to a detail condition such a condition for each session. Since the communication permission cannot be dynamically managed, when a communication partner being regularly permitted infects with a virus and attacks to other communication partners, it is impossible to prevent from the attack. Moreover, when the number of terminals is increased, the list of IP addresses becomes greater and then performance of the router is degraded. Accordingly, it is difficult to realize a larger scale.

As the authentication for each session, a technology such as SSL (Secure Socket Layer) can be generally used. However, since this technology is used at an end system, it is impossible to prevent from an attack such as the attack by DoS passing through a regular procedure.

The above-described problems in a conventional system can be summarized as follows:

(1) Since only a member can-be authenticated, it is impossible to authenticate a user over a different network being managed by another manager.

(2) Since the communication permission is managed based on information showing the communication permission for each communication partner, which is fixed, it is impossible to prevent from an attack by a terminal when the terminal temporarily becomes an attacker.

(3) Even if a session authentication is conducted at the end system and a filter is provided, when the attack of DoS, the attack achieves the end system. Accordingly, it is not sufficient to prevent from the attack.

SUMMARY OF THE INVENTION

It is a general object of the present invention to provide access management methods and access management servers in which the above-mentioned problems are eliminated.

A more specific object of the present invention is to provide an access management method and an access management server, in which an attack to a network can be flexibly prevented.

The above objects of the present invention are achieved by an access management method in a network including at least one end system, a packet communication unit for routing, and an access management server including an authentication function, the access management method including: authenticating a communication partner for each session and permitting a communication permitted by a communication partner in the access management server; and discarding a packet meeting a condition of a denied packet being denied by the communication partner in the packet communication unit.

According to the above invention, it is possible to determine a communication permission or a communication deny based on a fine condition for each section with respect to an attack to a network. Therefore, it is possible to flexibly manage the communication permission.

The above objects of the present invention are achieved by an access management server included in a network with an end system and a packet communication unit for conducting a routing, and including an authentication function, the access management server including: an authenticating part authenticating a communication partner for each session and permitting a communication permitted by a communication partner; and a discard setting part setting the packet communication unit to discard a packet meeting a condition of a denied packet being denied by the communication partner in the packet communication unit.

According to the above invention, it is possible to determine a communication permission or a communication deny based on a fine condition for each section with respect to an attack to a network. Therefore, it is possible to flexibly manage the communication permission.

In the access management server, the discard setting part may set a filtering part arranged in the packet communication unit to discard a packet meeting the condition of the denied packet being denied by the communication partner.

In the access management server, the discard setting part may provide fake information to a sender transmitting the denied packet being denied by the communication partner and discards a packet sent from the sender.

According to the above invention, it is possible to discard a packet meeting the condition of the denied packet being denied by the communication partner.

In the access management server, when a condition of the sender of a received packet meets the condition being registered in the denial list, before an authentication is conducted, the discard setting part sets the packet communication unit so as to discard the received packet.

According to the above invention, it is possible to omit a communication concerning an authentication while it is possible to discard a packet meeting the condition of the denied packet being denied by the communication partner.

BRIEF DESCRIPTION OF THE DRAWINGS

Other objects, features and advantages of the present invention will become more apparent from the following detailed description when read in conjunction with the accompanying drawings, in which:

FIG. 7 is a diagram showing a sequence of a filter process in a case in that the authentication fails, according to the embodiment of the present invention;

FIG. 9 is a diagram showing a configuration of the denial list DB according to the embodiment of the present invention; and FIG. 10 is a flowchart for explaining a denial process executed by the processing part of the access management server according to the embodiment of the present invention.

DESCRIPTION OF THE PREFERRED EMBODIMENT

An embodiment according to the present invention will be described with reference to the accompanying drawings.

In the present invention, a user authentication is conducted at a server (hereinafter, called "access management server"), which is accessed first when a communication starts such as a RADIUS (Remote Authentication Dial In User Service) server, a DNS (Domain Name System) server, a SIP (Session Initiation Protocol) server, or a like, and then a client, which will be a communication partner, determines a communication permission/deny at a session level. Based on a determination result (communication permission or communication deny) by the client, an access management is conducted at the session level of the client as a communication originator.

Before the user starts a communication, when the user requires a communication permission to communicate with the communication partner to the access management server, the access management server confirms with an end system (client or server) whether or not the user is permitted to communicate with the communication partner. When the end system permits the user to communicate with the communication partner, the access management server sends valid information of the communication partner to the user (client as the communication originator) so that the user can start to communicate with the communication partner. On the other hand, when the end system does not permit the user to communicate with the communication partner, the access management server sends invalid information of the communication partner to the user or a filter is set to a packet communication apparatus, so that the user cannot communicate with the communication partner. Therefore, a secured communication can be realized by conducting an access management at a fine level.

The present invention does not specify an operation on a special protocol. However, an embodiment using SIP (case of an SIP server operates as the access management server) will be illustrated. It should be noted that this mechanism itself is not limited only to apply to SIP but can be applied to other mechanisms such as an authentication function of a RADIUS server and a DNS server.

Figure 1:
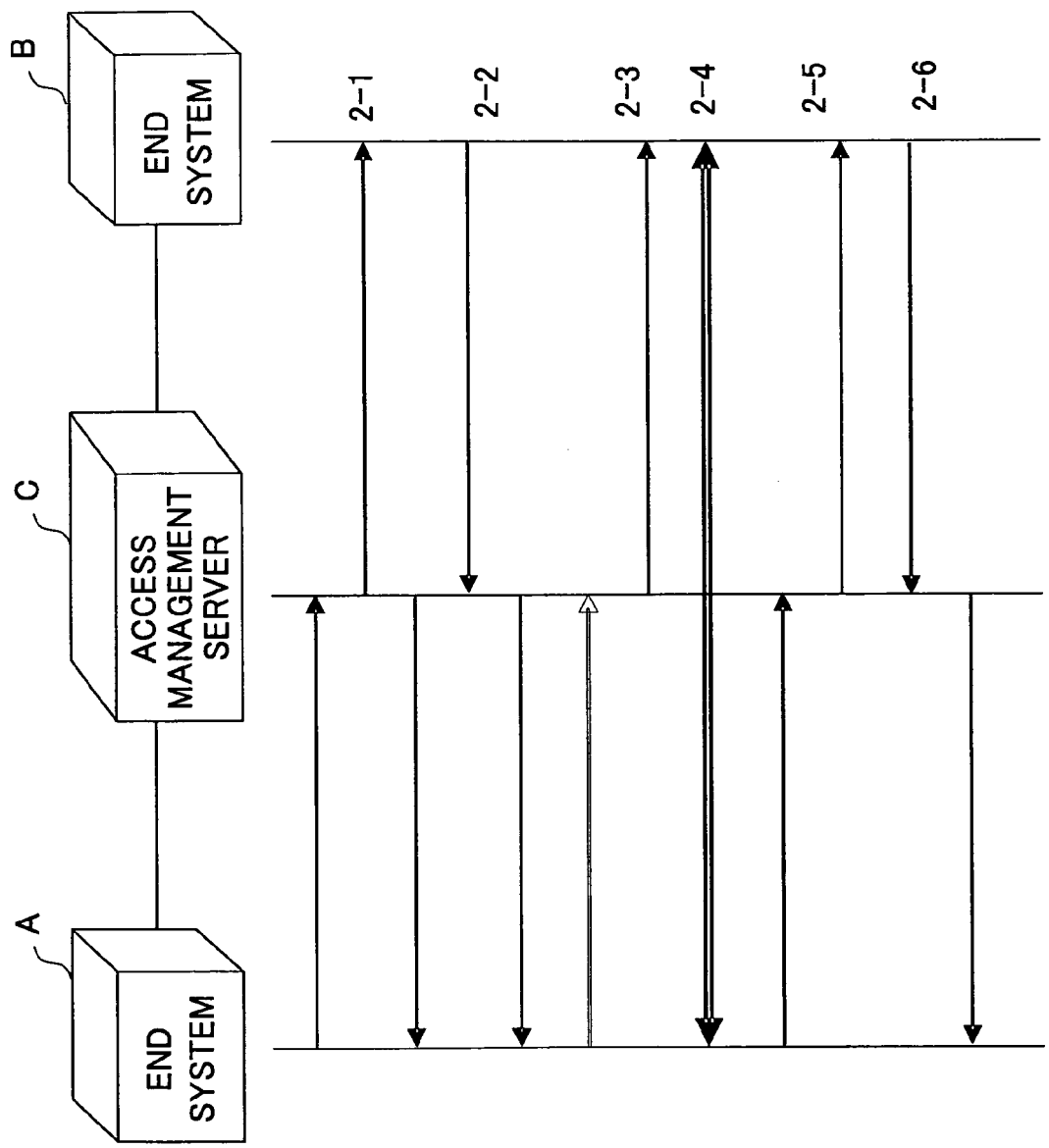
FIG. 1 is a diagram showing a general SIP sequence.

First, a general SIP sequence will be described with reference to FIG. 1. FIG. 1 is a diagram showing a general SIP sequence. In FIG. 1, an end system A sends an "INVITE" (session attend request) message to an access management server C. When the access management server C receives the "INVITE" message from the end system A, the access management server C transfers the "INVITE" message toward an end system B being a communication partner of the end system A. After that, the access management server C sends a draft response showing "100" to the end system A (step 2-1).

When the "INVITE" message from the end system A is valid, the end system B sends a success response showing "200" as a response with respect to the "INVITE" message to the end system A through the access management server C (step 2-2).

When the end system A receives the success response showing "200", the end system A sends an ACK (acknowledgement) message as a response to the end system B through the access management server C (step 2-3). A session is established between the end system A and the end system B by the above-described operations so as to communicate to each other (step 2-4).

When the communication between the end system A and the end system B ends, a process for ending the session is conducted. Any one of the system A and the system B can end the session. In this case, the session ends at a side which started the session. The end system A sends a BYE (end) message to the end system B through the access management server C (step 2-5).

When the end system B receives the BYE message, the end system B sends a success response showing "200" as a response message for the BYE message to the end system A through the access management server C, and then the session is released (step 2-6).

As described above, SIP is a protocol for establishing and releasing a session between end systems to communicate to each other, by using a simple interaction of a text base.

(1) An example of a conventional SIP header will be shown as follows:

"Via" includes an address that desires to receive a response with respect to a current request and a "branch" parameter for identifying a current transaction.

"To" includes a display name of a receiver of the current request optionally (this display name may not be included) and "SIP_URI".

"From" includes a display name of a sender of the current request optionally (this display name may not be included) and "SIP_URI". This header field also includes a tag parameter that is used as an identification.

"Call-ID" is a global unique identification (generated from "To tag" and "From tag") for a current call.

"CSeq" includes an integral value and a method name (the integral value is incremented).

"Contact" includes an address that desires to receive a response, and transmits a destination to receive a future request to another element.

"Content-Type" shows an explanation of a message body.

"Content-Length" shows a length of the message body.

(2) Conventional SIP methods used in this embodiment will be shown as follows:

"INVITE" is a session attend request.

"ACK" is a confirmation of a last response to "INVITE".

"BYE" is an end of a session.

(3) Conventional SIP response code used in this embodiment will be shown as follows:

"1xx" (draft response) shows that a current request is being processed and not completed.

"2xx" (success) shows that the current request is accepted.

"4xx" (client error) shows that a process cannot be conducted since an error occurs in a request. When the error is corrected, a retry is available.

(4) A SIP header of an extension message according to the present invention will be shown as follows:

"Default-GW" shows a default gateway sending a current message. Only the SIP server determines the default gateway and specifies a router to change settings.

"Port-type" shows a port number (UDP/TCP) used between end systems.

"Access-Authenticate-MD5" is a field which is used to conduct the authentication using an MD5 (Message Digest Algorithm 5 defined by RFC 1321).

In this field, the followings are included:

"-user" includes a user name and "realm", and shows the user name used for the authentication.

"-challenge" is a key sent from the SIP server.

"-response" is a response from an end system to the SIP server. A hash value of the user name and the password is calculated by using a key included in "-response" and is set in "-response".

(5) The SIP methods of the extension message according to the present invention will be shown as follows:

"USER-AUTH" is a request to indicate the sender and receiver to conduct the authentication when the SIP server receives the "INVITE" message from the end system.

"USER-AUTH-ACK" shows a confirmation of the last response with respect to "USER-AUTH".

(6) SIP response code of the extension message according to the present invention will be shown as follows:

"498 (DENIAL: denial response)" informs that a communication is denied with respect to a communication originator or communication contents.

"499 (AUTH-ERR: authentication process error)" informs that an error occurs when the authentication is conducted.

Figure 2:
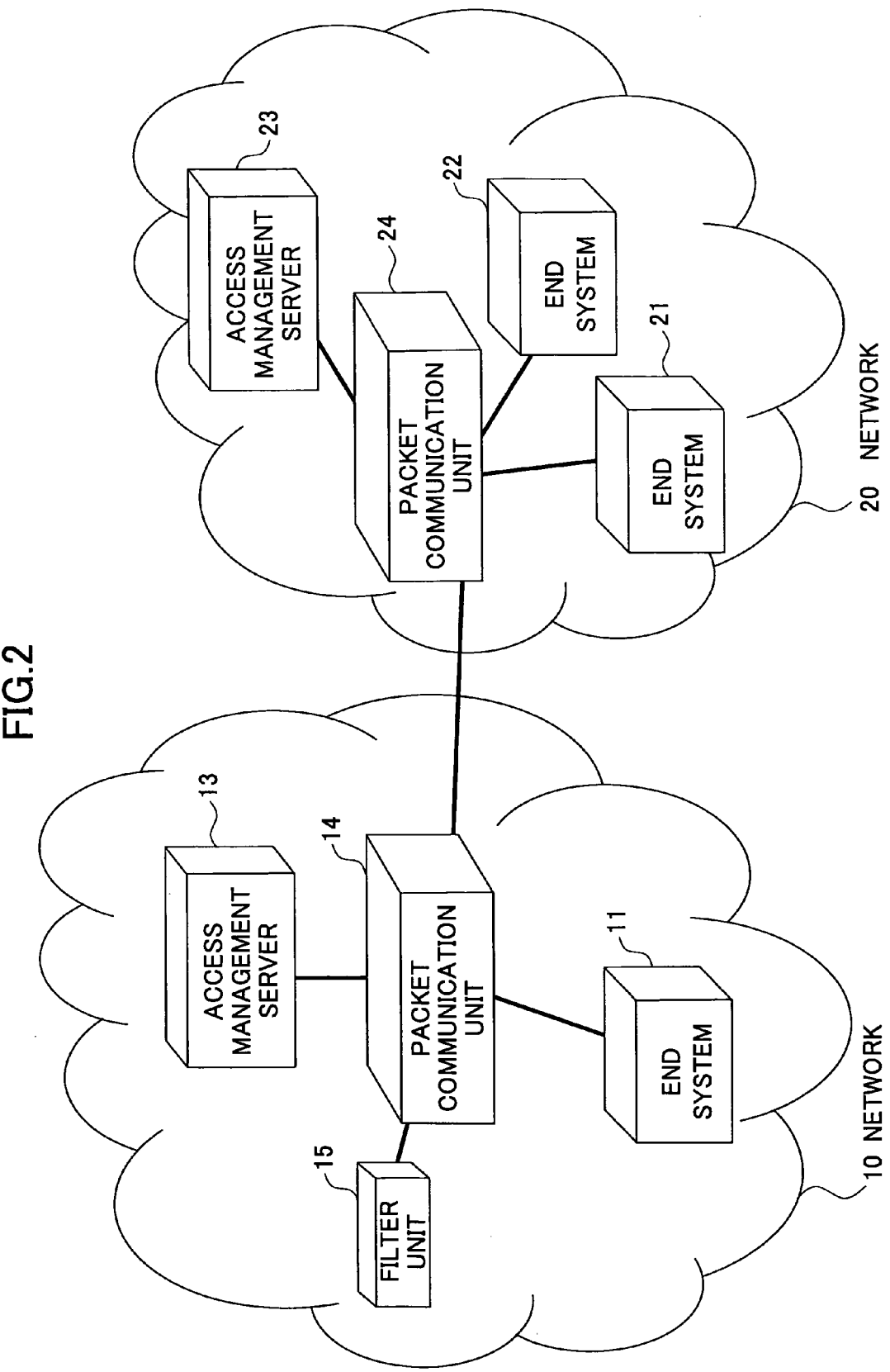
FIG. 2 is a diagram illustrating a configuration of a network according to the embodiment of the present invention.

FIG. 2 is a diagram illustrating a configuration of a network according to the embodiment of the present invention. In FIG. 2, a network 10 includes an end system (client or server) 11, an access management server 13, a packet communication unit 14, and a filter unit 15. A network 20 includes end systems (client or server) 21 and 22, an access management server 23, and a packet communication apparatus 24.

Figure 3:
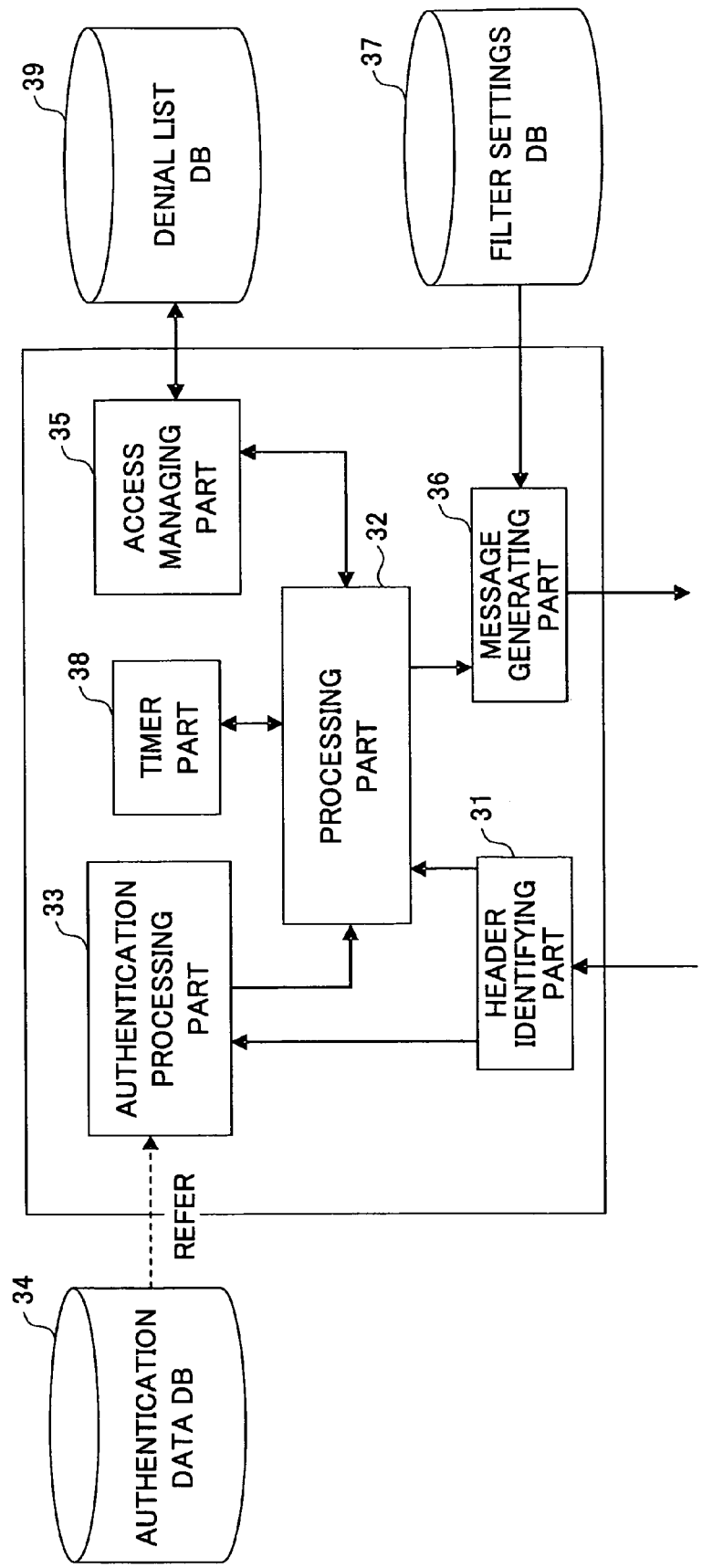
FIG. 3 is a block diagram showing a functional configuration of the access management server according to the embodiment of the present invention.

FIG. 3 is a block diagram showing a functional configuration of the access management server according to the embodiment of the present invention. In FIG. 3, for the sake of convenience, the functional configuration of the access management server 13 will be described. A functional configuration of the access management server 23 is the same as that of the access management server 13 and an explanation thereof will be omitted. In FIG. 3, the access management server 13 is a server computer controlled by a CPU (Central Processing Unit). The access management server 13 includes a header identifying part 31 for identifying a header of the SIP message, a processing part 32 for controlling the entire access management server 13, an authentication processing part 33 for conducting an authentication process, an authentication data DB (Database) 34 where an address of each terminal to be permitted by the authentication process is registered, an access managing part 35 for conducting an access management by referring to a denial list DB 39, a message generating part 36 for generating a message, a timer part 38 for conducting a time management of a denial list, a filter settings DB 37 for managing settings of an instruction method to change a filter of respective packet communication unit 14 or 24, and the denial list DB 39 where an address of the end system 11.

Figure 4:
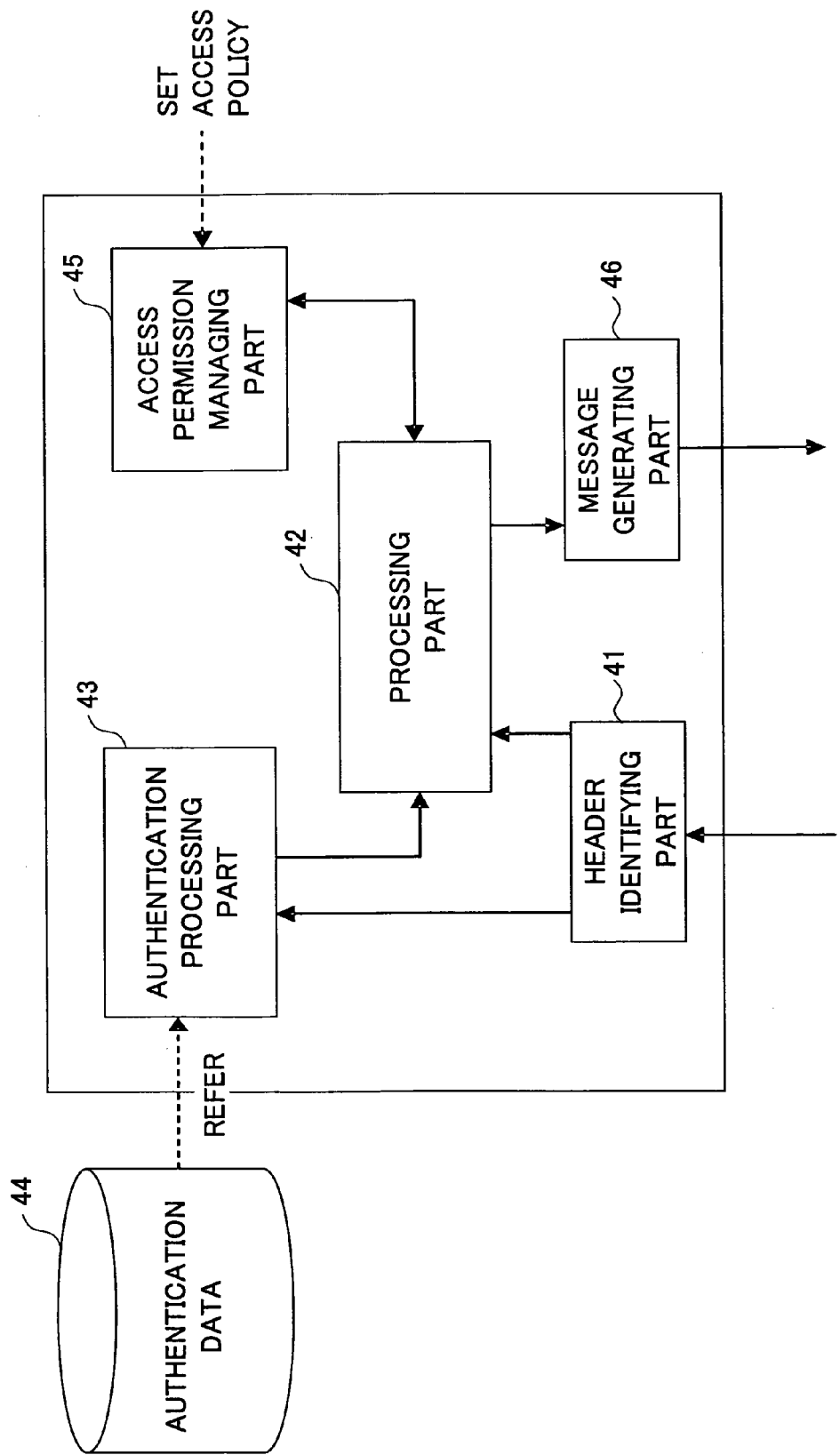
FIG. 4 is a block diagram showing a functional configuration of the end system according to the embodiment of the present invention.

FIG. 4 is a block diagram showing a functional configuration of the end system according to the embodiment of the present invention. In FIG. 4, for the sake of convenience, the functional configuration of the end system 11 will be described. A functional configuration of each of the end systems 21 and 22 is the same as that of the end system 11, and an explanation thereof will be omitted. In FIG. 4, the end system 11 includes a header identifying part 41 for identifying a header of the SIP message, a processing part 42 for controlling the entire the end system 11, an authentication processing part 43 for conducting the authentication process, an authentication data 44 where an ID and a password of a terminal to be permitted by the authentication process, an access permission managing part 45 for managing an access in accordance with an access policy being set, and a message generating part 46 for generating a message.

Figure 5:
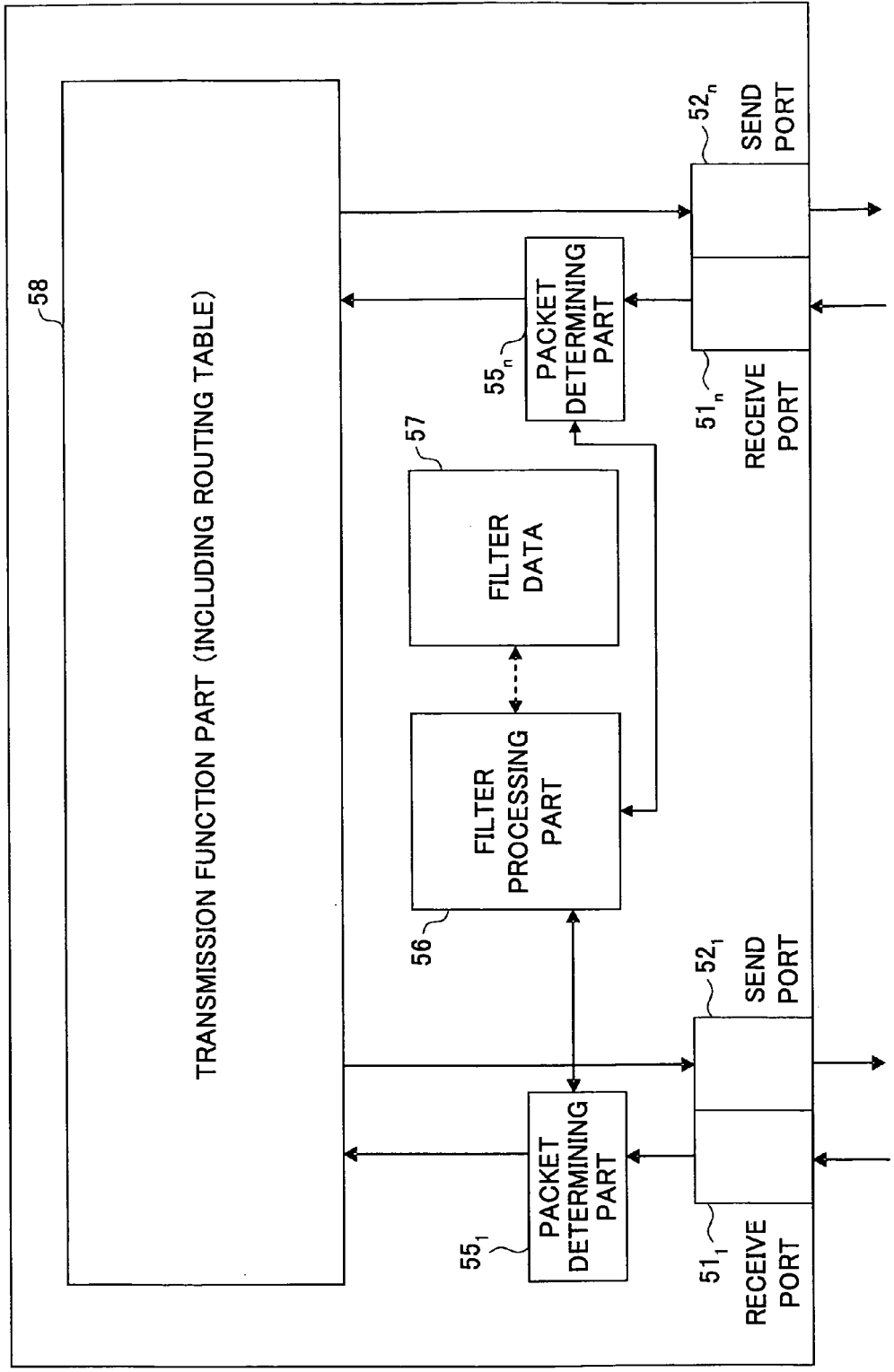
FIG. 5 is a block diagram showing a functional configuration of the packet communication unit according to the embodiment of the present invention.

FIG. 5 is a block diagram showing a functional configuration of the packet communication unit according to the embodiment of the present invention. In FIG. 5, for the sake of convenience, the functional configuration of the packet communication unit 14 will be described. A functional configuration of each of the packet communication unit 24 is the same as that of the packet communication unit 14, and an explanation thereof will be omitted. In FIG. 5, the packet communication unit 14 includes a plurality of receive ports $51_1$ through $51_n$, a plurality of send ports $52_1$ through $52_n$, a plurality of packet determining parts $55_1$ through $55_n$, a filter processing part 56 for discarding a packet, filter data 57 where a condition of a packet to discard is written, and a transmission function part 58 including a routing table.

Figure 6:
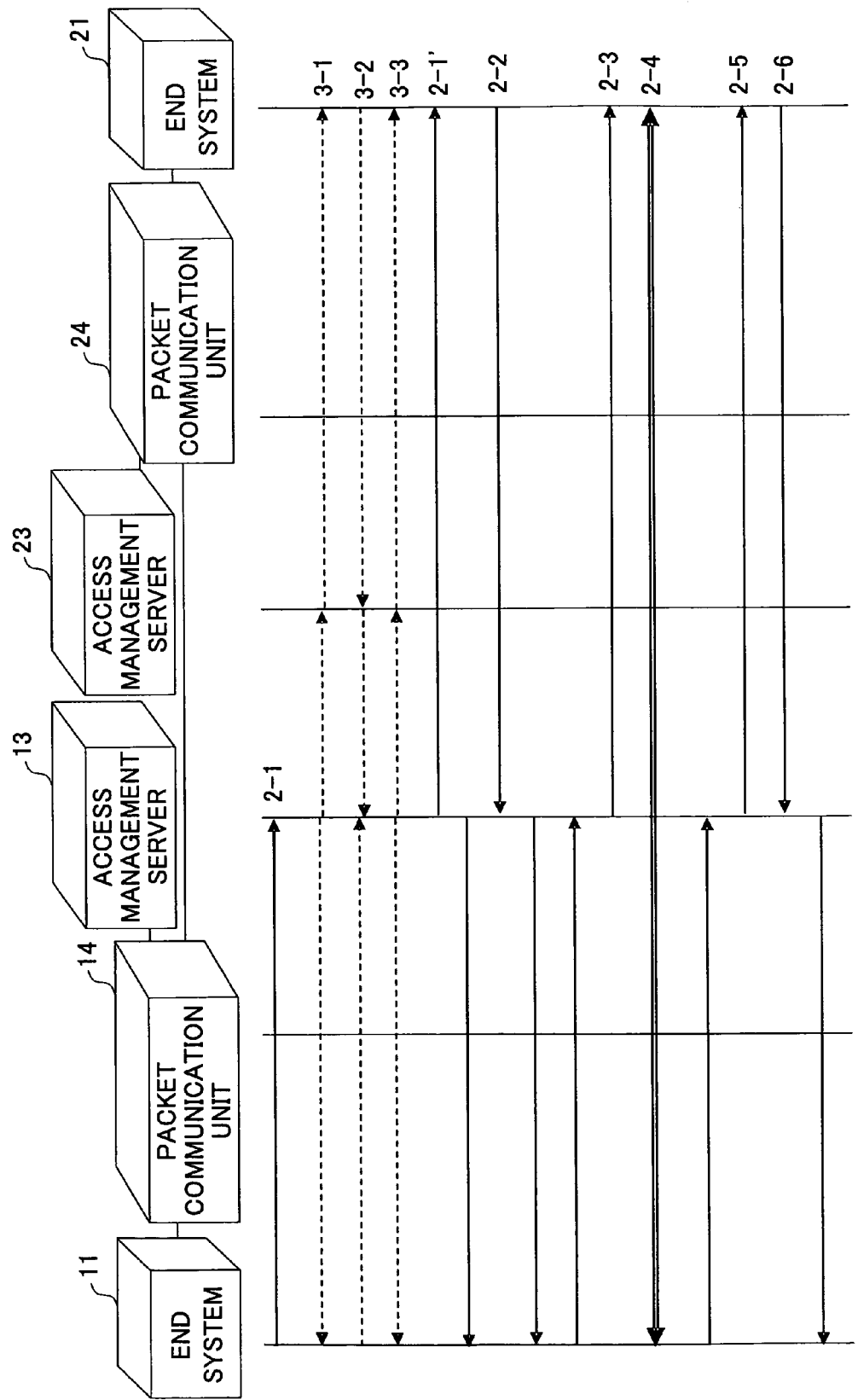
FIG. 6 is a diagram showing a sequence of a normal operation of an access management method according to the embodiment of the present invention.

FIG. 6 is a diagram showing a sequence of a normal operation of an access management method according to the embodiment of the present invention. In FIG. 6, the end system 11 sends the "INVITE" message to the access management server 13 for each session (step 2-1). In the present invention, "Port-type" field showing a port number used between the end systems is additionally provided to the "INVITE" message, so as to send detailed information to a receiver (communication partner).

When the access management server 13 receives the "INVITE" message, the access management server 13 identifies the SIP message in the header identifying part 31. When the access management server 13 determines that the message being received is the "INVITE" message, the access management server 13 processes the "INVITE" message by the processing part 32. In this case, it is assumed that the end system 11 is a sender as a request originator and the end system 21 is a receiver as a destination. First, the processing part 32 inquires the access managing part 35 to check whether or not the end system 11 sending the "INVITE" message is listed in the denial list DB 39. After the processing part 32 confirms that the end system 11 is not listed in the denial list DB 39, the processing part 32 instructs the message generating part 36 to send a message for conducting the authentication process to both the end system 11 being the sender and the end system 21 being the receiver.

In the embodiment of the present invention, since the end system 21 being the receiver is not located under a control of the network 10 to which the access management server 13 belongs, the message for the conducting the authentication process is transferred toward the access management server 23 of the network 20 in which the end system 21 being the receiver is located. In this case, the access management server 13 at a sender side operates as a proxy server.

In addition, when the end system 21 is registered in the denial list DB 39 of the access management server 23, a process is conducted in accordance with the access policy of the access management server 23. This process will be described later. The message generating part 36 generates a "USER-AUTH" message (including a "challenge" value in the "Access-Authenticate-MD5" field) and sends to the end system 21 (step 3-1). In this case, an authentication using MD5 is described but any authentication method other than this authentication can be used.

When the end system 21 receives the "USER-AUTH" message sent from the access management server 23, the end system 21 identifies the SIP message by the header identifying part 41. When the end system 21 confirms that the SIP message is the "USER-AUTH" message, the end system 21 conducts the authentication process by the authentication processing part 43. The ID and the password are stored in the authentication data 44. The authentication processing part 43 calculates a hash value by using the ID and the password and the "challenge" value being included in the "USER-AUTH" message, and sends the hash value to the processing part 42.

The processing part 42 sets the hash value as a "response" value, and inputs a value to a "user" value. Then, the processing part 42 instructs the message generating part 46 to reply to the access management server 23 with a message. In this case, the message generated by the message generating part 46 includes the "Default-GW" field. Also, the end system 11 being the sender conducts the same process as the end system 21 being the receiver as described above (step 3-2).

When the access management server 13 receives a response with respect to the "USER-AUTH" message, the access management server 13 identifies the end system 11 by the header identifying part 31, and conducts the user authentication by the authentication processing part 33. The authentication processing part 33 inquires the authentication data DB 34 to check whether or not the end system 11 is a permitted terminal.

As a result from the authentication process, when the end system 11 is the permitted terminal, the access management server 13 sends the "USER-AUTH-ACK" message as the acknowledgement message to the end systems 11 and 21 (step 3-3). If the authentication fails, the access management server 13 replies with a "499" response showing that an error occurs in the authentication process.

When the authentication process is completed, the access management server 13 transfers the "INVITE" message (step 2-1'). At this time, the end system 21 being the receiver (communication partner of the end system 11) checks the communication contents and determines whether or not the communication with the end system 11 is permitted.

When the end system 21 recognizes that the header identifying part 41 receives the "INVITE" message, the end system 21 sends the "INVITE" message to the processing part 42. The processing part 42 determines a permission of the communication with the end system 11 in accordance with the access policy set by a user of the end system 21 by using the access permission managing part 45. As information to use, the port number of the communication partner (or a combination of the port number and the IP address of the communication partner), the IP address of the communication partner, a subnet address to which the communication partner belongs, or a domain name of the communication partner can be used. Any combination may be used.

A case of permitting a communication will be described. When the communication is permitted, the processing part 42 instructs the message generating part 46 to generate a success response showing "200" and send the success response to the access management server 13 (step 2-2).

Similar to a regular process, when the end system 11 receives the success response showing "200" with respect to the "INVITE" message, the end system 11 sends an "ACK" message (step 2-3). The "ACK" message is sent to the end system 21 through the access management server 13, so that the communication between the end system 11 and the end system 21 becomes in an available state (step 2-4).

By the above-described process, the end system 11 can communicate with the end system 21 by using a permitted protocol. When the communication ends, similar to the regular SIP, the session for the communication is released by the "BYE" message (step 2-5 and step 2-6).

FIG. 7 is a diagram showing a sequence of a filter process in a case in that the authentication fails, according to the embodiment of the present invention. In FIG. 7, the end system 11 sends the "INVITE" message to the access management server 13 for each session, and the authentication is conducted for each session (step 2-1, and steps 3-1, 3-2, and 3-3). After the authentication, the "INVITE" message is transferred to the end system 21 (step 2-1'). Then, as described above, the communication between the end system 11 and the end system 21 is determined to permit or not based on information such as the IP address, the subnet address, the domain name, and the like.

When the processing part 42 of the end system 21 determines to deny the communication with the end system 11, the processing part 42 of the end system 21 instructs the message generating part 46 to send a denial response showing "498" to the end system 11 being the sender through the access management server 13 (step 4-1*a*). The denial response showing "498" includes a reason why the communication with the end system 11 is denied.

When the access management server 13 receives the denial response showing "498", the processing part 32 sends the information included in the denial response and the IP address of a side denying the communication to the access managing part 35 to write data into the denial list DB 39. For example, when the IP address is a denial item of the reason why the communication is denied, the access managing part 35 conducts a process for creating a list including the IP address of a denial side as the receiver (receiver who requests to create the list), the denial item "IP address", and an IP address value.

After that, the processing part 32 generates a message for setting a filter so as to discard a packet meting with the above condition based on the information of the list and sends the message to the packet communication unit 14, and the filter data 57 of the packet communication unit 14 are changed (step 4-2a). An instruction method to the packet communication unit 14 is set in the filter settings DB 37, and the message for setting the filter is generated in accordance with a rule shown in the instruction method.

Therefore, the filter data 57 of the packet communication unit 14 are changed, and the filter processing part 56 has the packet determining parts $55_1$ through $55_n$ determine whether or not a packet received at each of the packet receive ports $51_1$ through $51_n$ meets the condition. A packet meeting the condition is discarded by the filter processing part 56. A packet, which does not meet the condition, is supplied from the packet determining part 55 to the transmission function part 55, and is sent out from one of the send ports $52_1$ through $52_n$ to a destination.

The denial list registered in the denial list DB 39 arranged in the access management server 13 is managed by the timer part 38 to be deleted after a predetermined time passes from a time when the denial list is registered. However, filter data being bet by the packet communication unit 14 are not released until the end system 11 being sender receives the success response showing "200" with respect to the "INVITE" message, which meets the condition.

By the above-described mechanisms shown in FIG. 6 and FIG. 7, it is possible to conduct only a permitted communication and to filter and discard other communications.

For a filter process, a unit for the filter process such as the filter unit 15 shown in FIG. 2 may be arranged with the packet communication unit 14. In this case, the packet communication unit 14 always transfers a packet to the filter unit 15, and conducts a routing process only for the packet returned from the filter unit 15. Therefore, it is possible to reduce an amount of operation load of the packet communication unit 14.

In the embodiment, the filter settings are conducted to the packet communication unit 14 (24), so as to filter the packet. The packet communication unit 14 (24) is required to have higher performance and an enhanced function. In the following, in a case in that the packet communication unit 14 (24) is an existing packet communication unit in the network 10 (20), a mechanism to apply the present invention to the network 10 (20) will be described with reference to FIG. 8.

Figure 8:
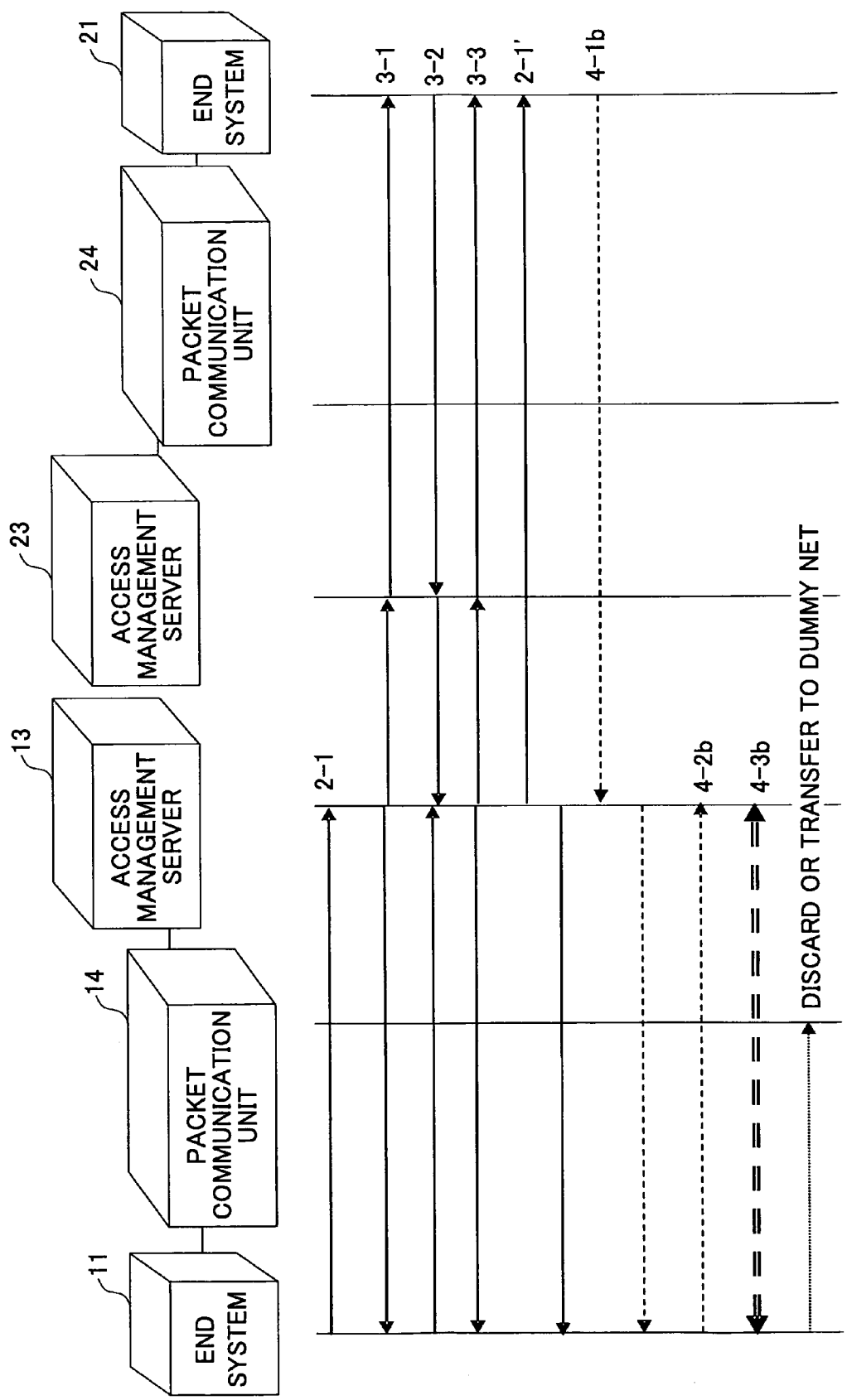
FIG. 8 is a diagram showing a sequence of a fake information providing process at a failure, according to the embodiment of the present invention.

FIG. 8 is a diagram showing a sequence of a fake information providing process at a failure, according to the embodiment of the present invention. In FIG. 8, the end system 11 sends the "INVITE" message to the access management server 13 for each session, and the authentication is conducted for each session (step 2-1, and steps 3-1, 3-2, and 3-3). After the authentication, the "INVITE" message is transmitted to the end system 21 (step 2-1'). As described above, it is determined whether or not a communication between the end system 11 and the end system 21 is permitted, based on information such as the port number, the IP address, the subnet address, the domain name, and the like.

In this case, when the processing part 42 of the end system 21 denies the communication with the end system 11, the processing part 42 instructs the message generating part 46 to send a denial response showing "498" to the access management server 13 (4-1b). A reason why the connection is denied is included in the denial response showing "498".

When the access management server 13 receives the denial response showing "498", the access management server 13 replaces the denial response showing "498" with a success response showing "200", and sends dummy information in which a destination is shown by an address corresponding to a loop back port of the packet communication unit 14 included in the "Default-GW" field.

The end system 11 being a communication request originator returns an "ACK" message in the same manner as the normal operation (4-2b), and continues this communication as if a session is established (4-3b). As a matter of fact, at the loop back port of the packet communication unit 14 being a first default gateway, the packet is discarded, so that the communication cannot be conducted with the communication partner. In this method, it is possible not to communicate with the end system 11, instead of providing a special function such as the filter function to the packet communication unit 14. In addition, this method has a smaller amount of load than the filter and can be realized easily Alternatively, instead of using the address of the loop back port of the packet communication unit 14, a decoy such as a honey pot or an address leading toward a dummy network can be used.

Next, a case of a failure in that an end system is registered in the denial list DB 39 of the access management server 13 (23) will be described.

FIG. 9 is a diagram showing a configuration of the denial list DB according to the embodiment of the present invention. In FIG. 9, in the denial list managed in the denial list DB 39, an IP address of a request originator (end system and an access management server), a denial item (denial level), at least one IP address of a denial subject (multiple settings), and a process start time are registered. The denial level is set as "0" (zero) when the denial list is initially registered in the denial list DB 39.

In a case in that the access management server 13 (23) is denied once for any reason and an end system registered as the denial subject in the denial list DB 39, instead of conducting the authentications in steps 3-1 through step 3-3 shown in FIG. 6 through FIG. 8, a response is directly returned. For example, if the filter process is used, the denial response showing "498" is sent. Alternatively, if the fake information providing process is used, the success response showing "200" and the dummy information are sent. Accordingly, it is possible to omit communications concerning the authentication.

FIG. 10 is a flowchart for explaining a denial process executed by the processing part of the access management server according to the embodiment of the present invention. The denial process is executed in a case in that an end system sending a communication request is registered in the denial list DB 39.

In FIG. 10, in step S10, the denial process determines whether or not the denial level of the communication request in the denial list DB 39 is "0". When the denial level is "0", in step S11, the denial process determines whether or not other end systems also denied, that is the denial process determines whether or not a plurality of the same denial subjects are registered in the denial list DB 39. When the denial subject is not denied by the other end systems, in step S12, the denial process blocks a special communication, which is indicated by a port number (corresponding to an application) of the sender transmitting the communication request or a port number and an IP address of the sender. In addition, the denial process changes the denial level of the communication request in the denial list DB 39 to "1".

On the other hand, when it is determined in step S10 the denial level is not "0", the denial process determines whether or not the denial level is "1". When the denial level is "1", the denial process advances to step S14. When it is determined that the end system as the denial subject is denied by other end systems in step S11, the denial process advances to step S14. In step S14, only the special communication indicated by the IP address of the sender transmitting the communication request is blocked. Simultaneously, the denial process changes the denial level of the communication request in the denial list DB 39 to "2".

Moreover, when it is determined that the denial level is "1" in step S13, the denial process determines in step S15 whether or not the denial level is "2". When the denial level is "2", the denial process advances to step S16. In step S16, the denial process blocks all special communications from the subnet address to which the IP address of the sender transmitting the communication request belongs. Simultaneously, the denial process changes the denial level of the communication request in the denial list DB 29 to "3".

Furthermore, when the denial process determines in step S14 that the denial level is "2", the denial process advances to step S17. In step S17, the denial process blocks all special communications from a domain to which the IP address of the sender transmitting the communication request belongs. Simultaneously, the denial process changes the denial level of the communication request in the denial list DB 39 to "4".

As described above, it is possible to change the denial level based on the port number (and IP address) of the sender transmitting the communication request, the IP address of the sender, the subnet address to which the sender belongs, the domain name to which the sender belongs, and the like. Therefore, it is possible to gradually extend a range to deny the special communication.

Moreover, for example, in a case in that a packet from the sender being denied by a communication port A is also denied by the communication port B within a constant time or in a case in that communication requests from a plurality of communication partners are denied within a constant time, an end system as the sender may be infected by a virus and then attack other end systems. In this embodiment, in order to suppress a in crease of an amount of load of the other end systems by this attack, all packets sent from the end system as the sender and received by the access management server 13 (23) are discarded for a predetermined time, and all communications from the end system as the sender are denied.

As described above, it is possible to control a communication for each fine condition such as information concerning an application, a time span of the communication, and a like. Therefore, it is possible to improve the security of the network while coexisting with convenience of the network. Moreover, it is possible to support an IP telephone using SIP that has been attracted recently. Thus, the present invention can be applied as means for blocking nuisance call by the IP phone. Furthermore, with respect to an attack of DoS, it is possible to block the attack near an attacker. Thus, security of the network that cannot be realized by the conventional technologies can be realized by the present invention.

The processing part 32, the authentication processing part 33, the authentication DB 34, and the message generating part 36 correspond to a communication permitting part cited in claims, the processing part 32, the access managing part 35, the message generating part 36, the filter settings DB 37, and the denial list DB 39 correspond to a discard setting part, and the filter processing part 56 and the filter data 57 correspond to a filtering part.

According to the present invention, it is possible to determine the communication permission or deny based on the fine condition for each session with respect to the attack to the network.

The present invention is not limited to the specifically disclosed embodiments, and variations and modifications may be made without departing from the scope of the invention.

The present application is based on Japanese Priority Application No. 2004-203675 filed on Jul. 9, 2004, the entire contents of which are hereby incorporated by reference.

What is claimed is:

1. An access management method in a network including at least one end system, a packet communication unit for routing, and an access management server including an authentication function, said access management method comprising:
   authenticating a request originator and a communication partner for each session in the access management server;
   receiving, from the communication partner, a denial response against the request originator being authenticated before establishing a session in the access management server;
   replacing the denial response with a successful response and sending fake information of the successful response to the request originator so as to prevent from establishing the session in the access management server;
   setting a condition of a denied packet being denied by the communication partner in the access management server; and
   discarding a packet meeting the condition of the denied packet in the packet communication unit.

2. An access management server included in a network with an end system and a packet communication unit for conducting a routing, and including an authentication function, said access management server comprising:
   an authenticating part authenticating a request originator and a communication partner for each session;
   a receiving part receiving, from the communication partner, a denial response against the request originator being authenticated before establishing a session;
   a replacing part replacing the denial response with a successful response and sending fake information of the successful response to the request originator so as to prevent from establishing the session; and
   a discard setting part setting the packet communication unit to discard a packet meeting a condition of a denied packet being denied by the communication partner.

3. The access management server as claimed in claim 2, wherein the discard setting part sets a filtering part arranged in the packet communication unit to discard a packet meeting the condition of the denied packet being denied by the communication partner.

4. The access management server as claimed in claim 3, wherein the filtering part is a unit separated from the packet communication unit and is arranged with the packet communication unit.

5. The access management server as claimed in claim 2, further comprising a denial list to which a condition of a sender to deny a communication with the sender is registered,
   wherein when a condition of the sender of a received packet meets the condition being registered in the denial list, before an authentication is conducted, the discard setting part sets the packet communication unit so as to discard the received packet.

6. The access management server as claimed in claim 2, wherein the discard setting part provides fake information to a sender of the denied packet being denied by the communication partner, and leads a packet sent from the sender to a decoy network to discard the packet.

7. The access management server as claimed in claim 5, wherein the condition of the sender to deny a communication with the sender in the denial list shows a port number of the sender.

8. The access management server as claimed in claim 5, wherein the condition of the sender to deny a communication with the sender in the denial list shows an IP address of the sender.

9. The access management server as claimed in claim 5, wherein the condition of the sender to deny a communication with the sender in the denial list shows a subnet address of the sender.

10. The access management server as claimed in claim 5, wherein the condition of the sender to deny a communication with the sender in the denial list shows a domain name of the sender.

11. The access management server as claimed in claim 5, wherein the denial list is registered so as to deny a communication from the sender for a predetermined time when the communication partner denies the communication from the sender.

12. The access management server as claimed in claim 5, wherein the denial list is registered so as to deny all communications from the sender the communication partner denies the communication from the sender multiple times within a predetermined time.

13. The access management server as claimed in claim 5, wherein the denial list is registered so as to deny all communications from the sender when a plurality of communication partners deny the communication from the sender within a predetermined time.

\* \* \* \* \*